June 8, 1926.

A. S. HUGHES 1,588,110

TAIL GATE FOR DUMPING BODIES

Filed Oct. 23, 1922

Arthur S. Hughes INVENTOR

WITNESSES

BY

ATTORNEY

June 8, 1926. 1,588,110
A. S. HUGHES
TAIL GATE FOR DUMPING BODIES
Filed Oct. 23, 1922 6 Sheets-Sheet 2
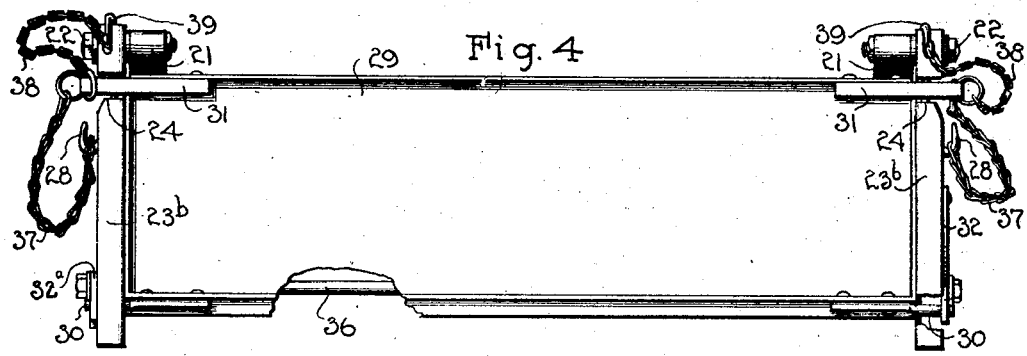
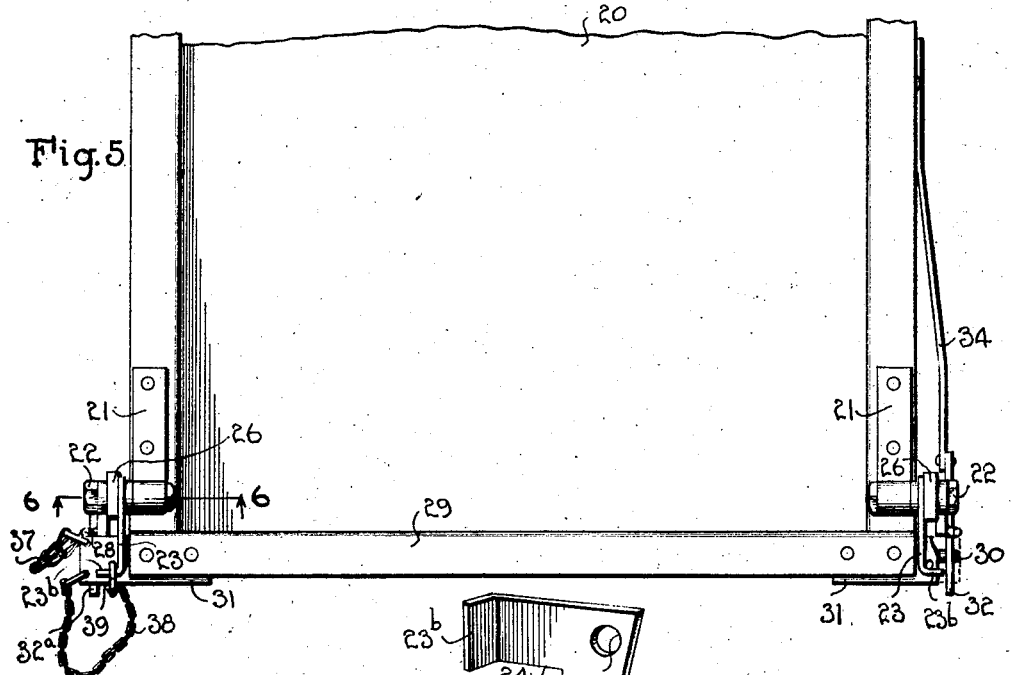
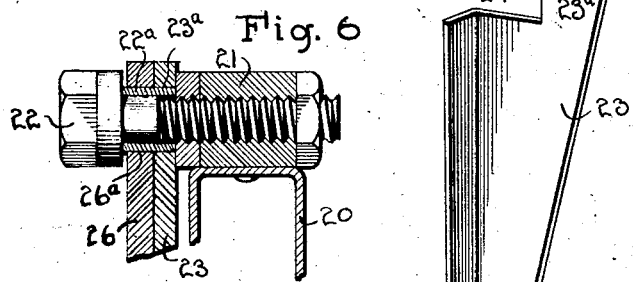
Arthur S. Hughes
INVENTOR June 8, 1926.

A. S. HUGHES 1,588,110

TAIL GATE FOR DUMPING BODIES

Filed Oct. 23, 1922   6 Sheets-Sheet 3

Arthur S. Hughes
INVENTOR

WITNESSES

BY

ATTORNEY

June 8, 1926.

A. S. HUGHES

TAIL GATE FOR DUMPING BODIES

Filed Oct. 23, 1922  6 Sheets-Sheet 4

Arthur S. Hughes INVENTOR

WITNESSES

BY

Philip E. Siggers.

ATTORNEY

June 8, 1926.

A. S. HUGHES 1,588,110

TAIL GATE FOR DUMPING BODIES

Filed Oct. 23, 1922   6 Sheets-Sheet 5

Arthur S. Hughes INVENTOR

WITNESSES

BY

ATTORNEY

June 8, 1926.

A. S. HUGHES 1,588,110

TAIL GATE FOR DUMPING BODIES

Filed Oct. 23, 1922   6 Sheets-Sheet 6

Arthur S. Hughes, INVENTOR

WITNESSES
Charles H. Ourand
Philip E. Siggers.

BY
E. G. Siggers

ATTORNEY

Patented June 8, 1926.

1,588,110

UNITED STATES PATENT OFFICE.

ARTHUR SHERIDAN HUGHES, OF MANSFIELD, OHIO.

TAIL GATE FOR DUMPING BODIES.

Application filed October 23, 1922. Serial No. 596,348.

This invention relates to improvements in the bodies of dumping wagons or trucks, and particularly to the tail or rear gates thereof.

An object of the invention is to provide a tail gate which can be held in a variety of positions, so that dumping of the load may be controlled as desired.

Other objects are to provide a pivot mounting for tail gates which permits easily assembling of the gate and body, which is economical to manufacture, and which operates with facility.

The invention has other aims which will appear from the following detailed description of certain illustrative embodiments of the invention shown in the accompanying drawings forming a part of this specification.

In the drawings:

Figure 4 is an end elevation of the wagon body showing the gate closed;

Figure 5 is a top plan view of the rear end of the wagon body with the gate closed;

Figure 6 is a section on the line 6—6 of Fig. 5;

Figure 7 is a perspective view of one of the swinging side or hanger bars used to support the tail gate on the body;

Figure 16:
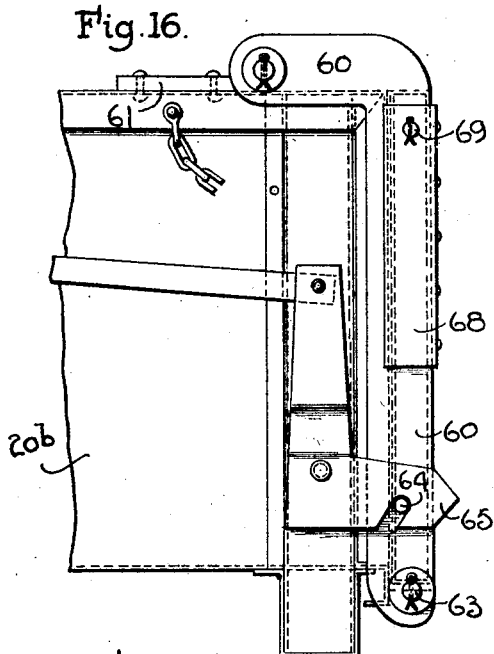
Figure 17:
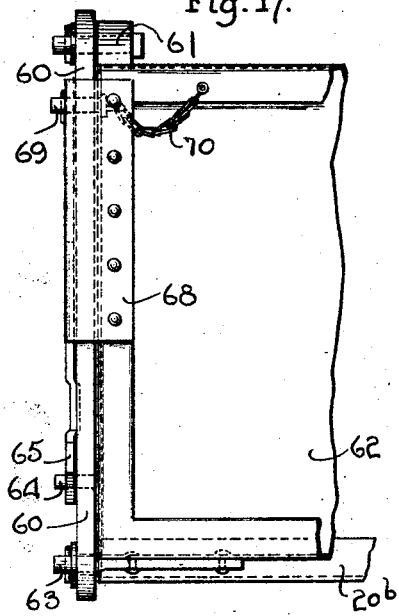
Figure 18:
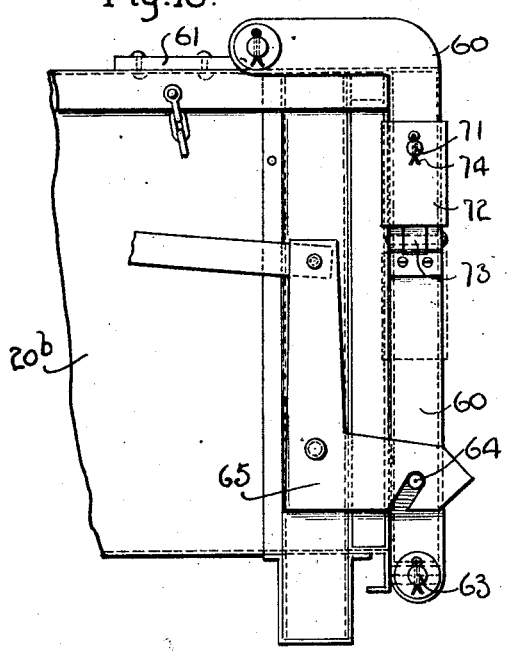
Figure 19:
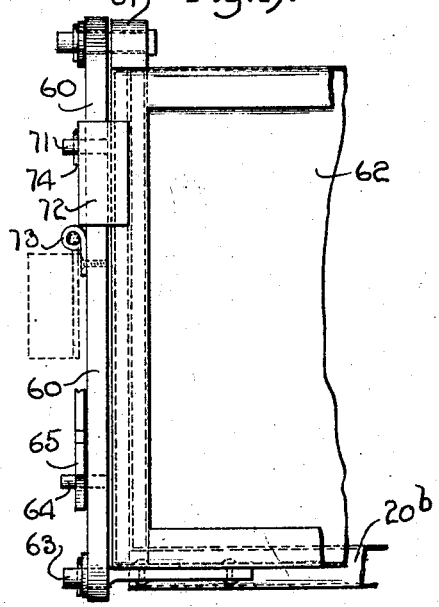

Figures 16 and 17 are respectively side and end elevations of a fragmentary character, showing another modification; and Figures 18 and 19 are views similar respectively to Figures 16 and 17, but showing still another modified form which the invention may take.

Referring more specifically to the preferred embodiments of the invention shown in the drawing merely by way of example, and first particularly to the form illustrated in Figures 1 to 7 inclusive, there is shown the rear portion of a steel wagon or truck body 20, whose particular construction need not be described, since it does not enter into the invention.

At the rear end of body 20 and on the top edges thereof, two hinge members 21 are secured. Tail gate supporting means in the form of hanger bars 23 are pivotally connected to hinge members 21 in any preferred manner, for example, as shown in Figs. 5 and 6. A bolt 22 is secured by screw threads to each member 21, and is passed through the swinging side bar 23, shown separately in Fig. 7. A bushing $22^a$ is revoluble on the unthreaded part of bolt 22, as shown, and fits a perforation $23^a$ near one end of bar 23. The necessary washers and nuts are also used. The connection is such that each side or hanger bar 23 may swing freely in a vertical plane on the outside of body 20 without turning bolt 22. It will be understood from Fig. 6, that bolt 22 can be drawn up tightly without interfering with free swinging of side bar 23, and that such swinging does not wear the bolt materially.

The side bars 23 each have a longitudinally extending continuous strengthening flange $23^b$ preferably bent at right angles as shown in Figure 7; and near the end where perforations $23^a$ are provided, the side bars 23 are slotted, as at 24, said slots 24 preferably extending through the longitudinal flange and about half way across the width of bar 23. It is preferred that the side or hanger bars 23 taper as seen in Fig. 7, from the slotted end to the opposite end, near which a bore or perforation 25 is provided for a purpose to be explained. A plate 26 may be secured to each side bar 23 adjacent perforation $23^a$ and have a matching perforation $26^a$ through which bolt 22 is passed. The plates 26 provide the additional thickness desirable where the side bars pivot on the bolts 22, and increase the strength of the hinge connection. A strap 27 having a hook point 28 is joined to each plate 26, or else the hook 28 may be integral with plate 26. The hook 28 is used as a connection for one end of a gate supporting chain 37 to be described later.

Figure 3:
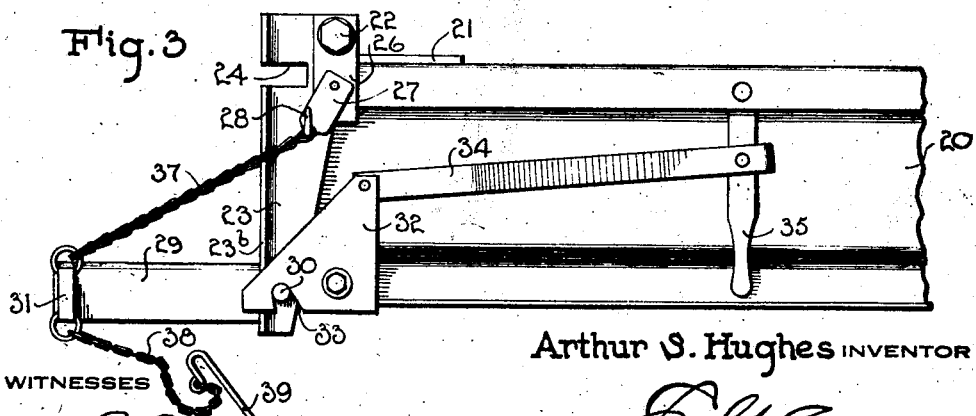
Figure 3 is a similar view showing the gate open and held in the plane of the bottom of the wagon body.

The tail gate 29, the construction of which will be clear from Figures 3, 4 and 5, is usually rectangular, as shown, with a strengthening flange bordering its perimeter. Hinge pintles 30 are secured at the opposite lower corners of gate 29, and project outwardly so as to be engageable in the perforations 25 of the side bars. By these, or similar means, the gate 29 is hinged to and between the two bars 23, which in turn are pivotally connected at their opposite or upper ends with the wagon body as before explained. Thus a double hinge mounting for the tail gate is provided.

Figure 1:
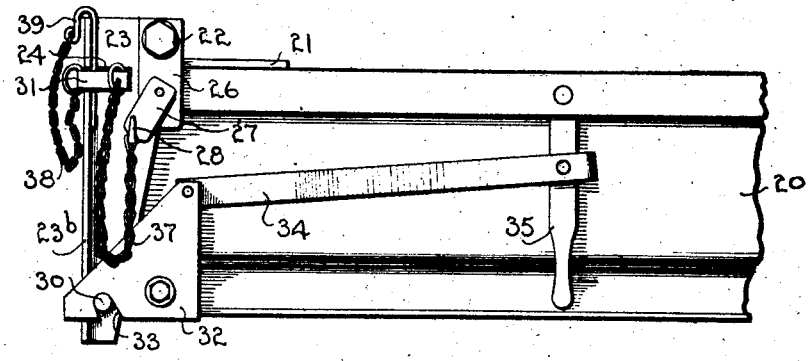
Figure 1 is a side elevation of a wagon or truck body provided with one form of my improved tail gate, showing the gate closed and locked.

At opposite ends at the top the gate 29 has bars or projections 31 projecting therefrom, said bars passing through slots 24 in the side bars 23 when the gate is swung on pintles 30 from the position of Fig. 3 to that of Fig. 1. In order to lock the gate after bars 31 are received within the slots, a chain or chains 38 each having a pin 39 on one end, are attached in any convenient manner to gate 29, and perforations in bars 31 are provided to receive the pins 39, which preferably have bent upper ends to rest on the top edges of side bars 23, as shown in Figure 1. Obviously the longitudinal flanges of side bars 23 prevent outward swinging of the gate on its pintles 30 when the pins 39 are passed through bars 31. The chain or chains 37 secured at one end to gate 29 may be detachably engaged with hooks 28 to hold the gate horizontal, as shown in Fig. 3.

Figure 2:
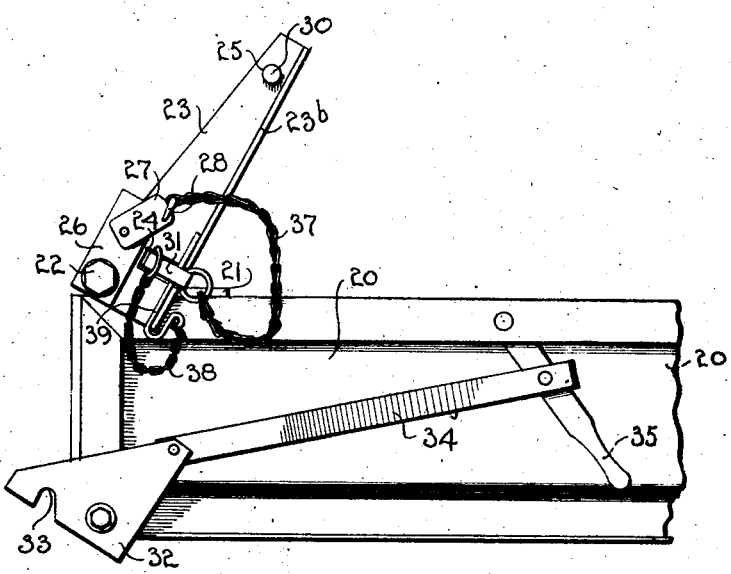
Figure 2 is a similar view showing the gate swung above the wagon body.

It will be clear that the side or hanger bars 23 are swingable about bolts 22 as pivots when the gate 29 is locked as by pins 39. To prevent swinging of side bars 23, which would necessarily entail swinging of the gate, some locking means must be provided. One form of locking means is shown in Figures 1, 2 and 3, and comprises a latch 32 having a notch 33 into which pintle or pin 30 is received. The latch 32 is pivoted on the body 20, and is operated by a link 34, pivotally connected thereto and to an operating lever 35 swingably carried upon the body. On the other side of the body, a latch 32$^a$ is mounted, and a transverse rod 36, shown in Fig. 4, mounts both latches so that they are swung simultaneously into or out of latching position. Fig. 2 shows the latches disengaged from pintles 30, while Figs. 1 and 3 show the side bars locked by the latches.

The different positions into which the above-described gate may be put for various purposes will now be made plain. When the latching pins 39 and latches 32, 32$^a$ are active, the gate, as shown in Figure 1, is held shut, so that no part of the load can spill out the rear end of the body. As soon as latches 32, 32$^a$ are disengaged, the gate can be swung on bolts 22 as pivots into the position of Fig. 2. Moreover, if the latches 32, 32$^a$ are disengaged, the gate will swing by gravity and maintain a vertical position when the dumping body is raised, as will be understood from Fig. 15. Again, the gate may be unlocked from the side bars 23 and swung on pintles 30 into the position shown in Fig. 3, the chains 37 being employed to hold the gate 29 in extended position. With the gate so held, the wagon body may be tilted for dumping purposes, whereupon the gate acts as a chute for the material being unloaded. Finally the gate may be allowed to hang pendently from the pivots 30 by disengaging chains 37 from hooks 38.

The entire gate structure is readily disassembled; it is only necessary to loosen the two bolts 22 and release latches 32, 32$^a$ in order to remove the gate; and the assembling operation is equally simple.

In Figs. 8 to 12 inclusive, I have shown another form which my invention may assume. The truck or wagon body 20$^a$, while shown as of a construction different from body 20, needs no particular description in this specification. Near the rear end and on the upper edges the body 20$^a$ carries hinge members 40, similar to members 21. Upon these hinge members two side bars or hangers 42 are swingably mounted, as by bolts 41, the mounting being preferably similar to the construction of Fig. 6. The side bars 42 thus swing in vertical planes about bolts 41 as pivots. A rod 43 connects the side bars 42 so that their swing is simultaneous, and in conjunction with bars 42 provides a gate supporting frame. When this frame is in its upper-most position shown in Fig. 9, the rod 43 rests on the upper edges of body 20$^a$, and the gate is vertical. The rod 43 may also be grasped by the operator to swing the gate outwardly after unlatching to permit dumping or discharge of the load.

Figure 8:
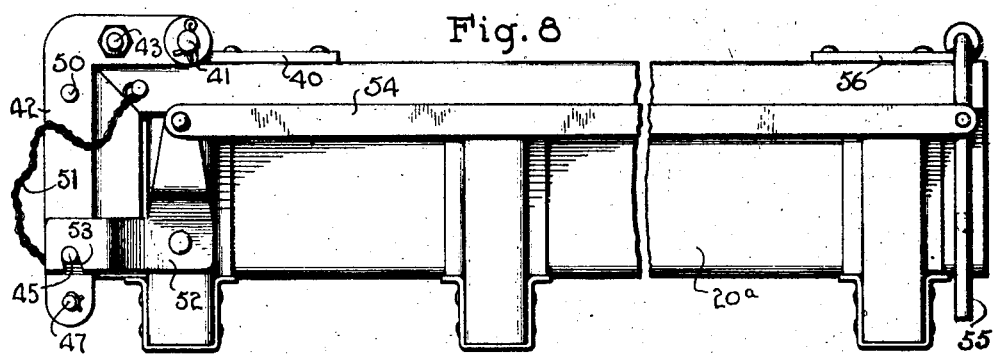
Figures 8, 9 and 10 are side elevations of a modified construction showing the tail gate in three different positions.
Figure 9:
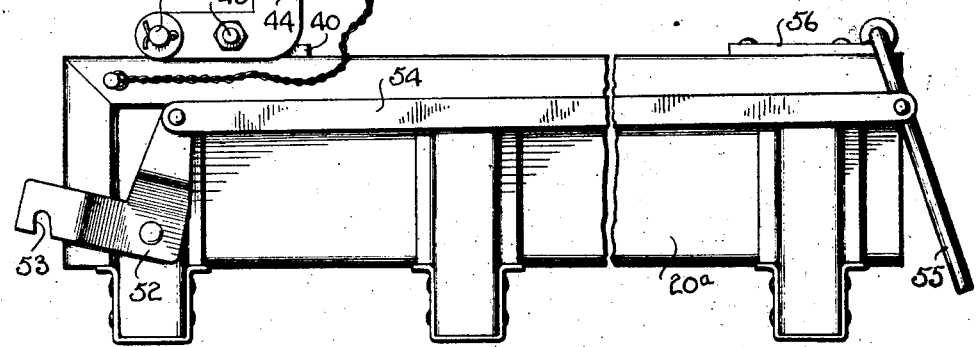
Figure 10:
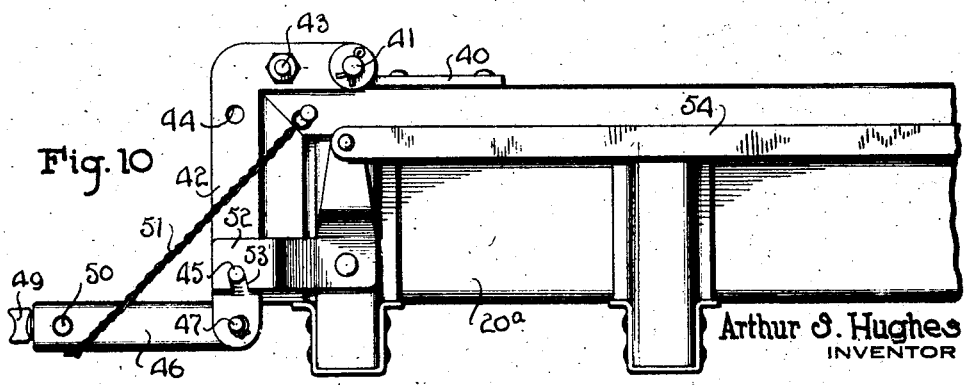
Figure 11:
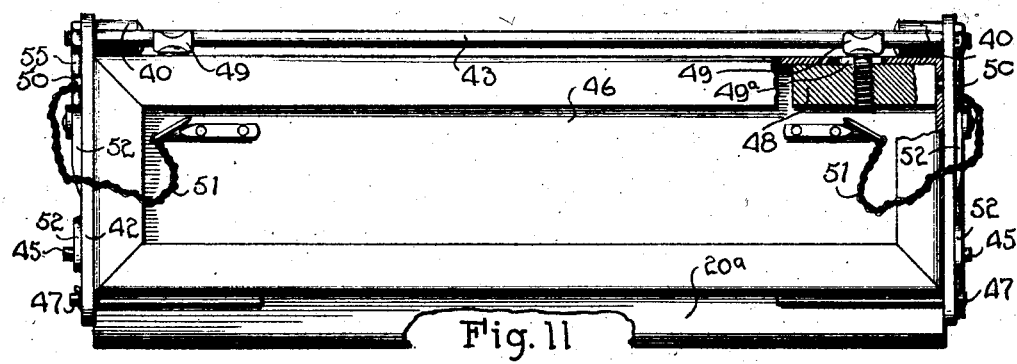
Figure 11 is a rear end elevation of the same form as Figures 8, 9 and 10, showing the gate closed, parts being broken away.
Figure 12:
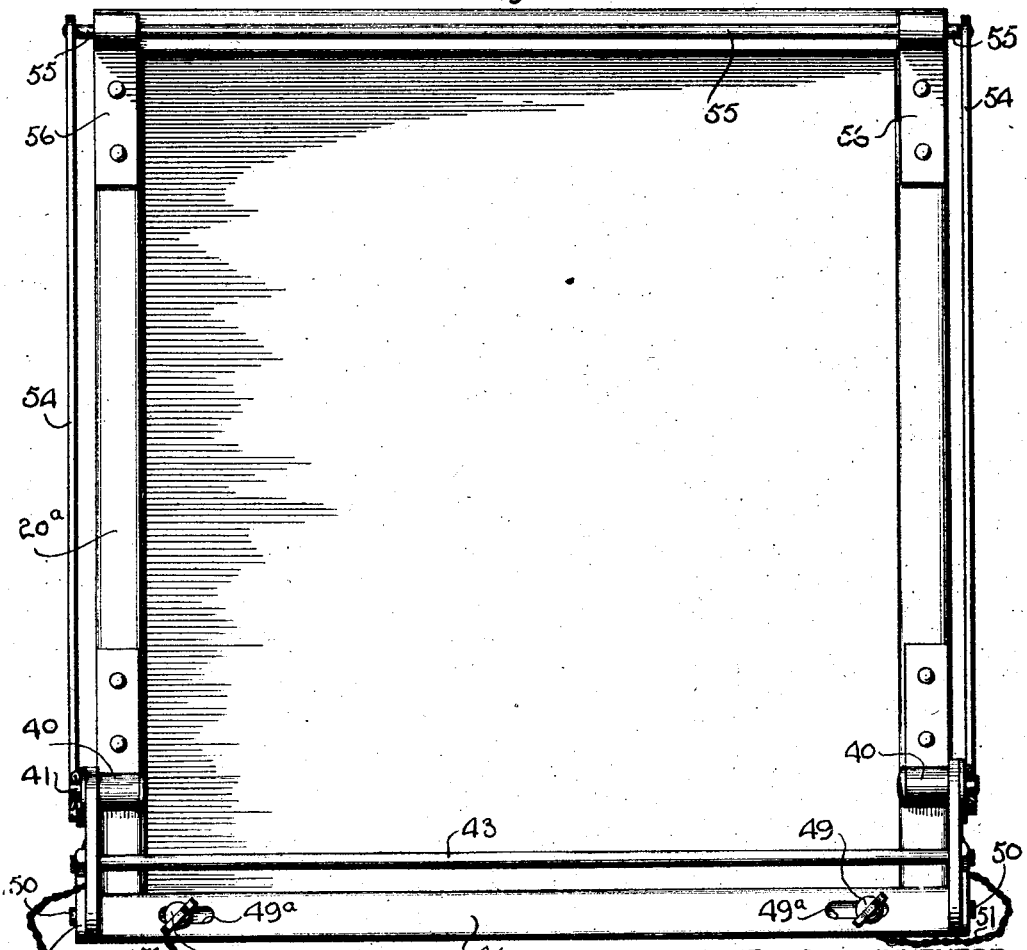
Figure 12 is a top plan view of the construction of Figures 8 to 11, with the gate closed.

The two bars or hangers 42 are exactly alike, and therefore a description of one will suffice. I prefer, in this embodiment of the invention, to shape bar 42 like the letter L, with unequal legs, and to secure rod 43 at one of its ends to the short leg of the side bar near the angle thereof. The side bar 42 has a perforation 44 also provided near the angle but in the long leg, the purpose of which will be explained later. Toward the extremity of the longer leg of the side bar a pin 45 is secured for the purpose of providing a member with which a latch 52 may engage, as shown in Figs. 8 and 10. The free end of each side bar 42 is perforated to receive a pintle 47 provided on one end of tail gate 46, whereby the gate 46 may swing between side bars 42. The construction of the gate itself will be understood from Figs. 10, 11 and 12.

In order to hold the gate to the side bars whereby the gate and side bars will move together, and so that the gate may be locked in closed position, I employ gate latching means including a latch 48 operable by a handle 49 (Fig. 11) and having a reduced end or bolt 50 which may be passed through a hole provided in the side flange and through perforation 44 in the side bar. Preferably handle 49 is a thumb screw which projects through a slot 49ª in the upper edge of the gate, and which may be screwed down against said gate edge whereby the latch is held securely, either in active or inactive position, and without rattling.

As shown in Fig. 10, the gate 46 is provided with a chain 51 also attached to the wagon body to hold the gate in the plane of the bottom of the body after the gate is unlatched from the side bars. To hold the side bars fast against the end of the body, I employ latches 52 mounted on opposite sides of the body adjacent the rear end and having slots 53 for receiving pins 45.

The latches 52 are pivotally connected with links 54 operated by handles 55 swingably mounted in hinge elements 56 at the forward end of the body. By releasing latches 52, the side bars may swing from the top on bolts 41 as pivots; and by releasing latches 48, the gate may be swung relative to the side bars on pivots 47. Thus the gate 46 of Figures 8 to 12 may be swung and maintained in the same positions which gate 29 may assume.

It will be clear from the foregoing that the construction of Figures 1 to 7 inclusive differs from the construction of Figures 8 to 12 inclusive only in minor details; the same principles underlie both forms of the invention.

Figure 13:
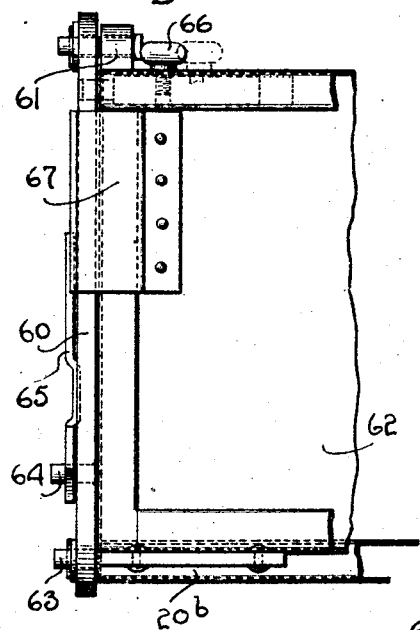
Figures 13, 14 and 15 are fragmentary views respectively in end elevation, plan, and side elevation, of another construction embodying the invention.
Figure 14:
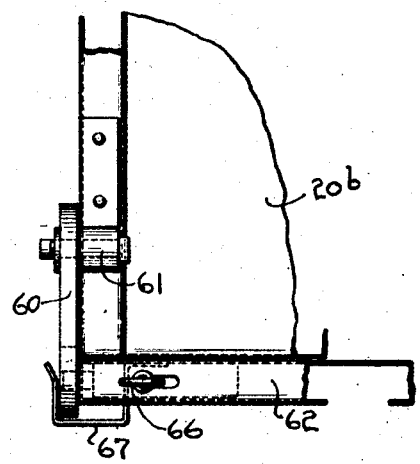
Figure 15:
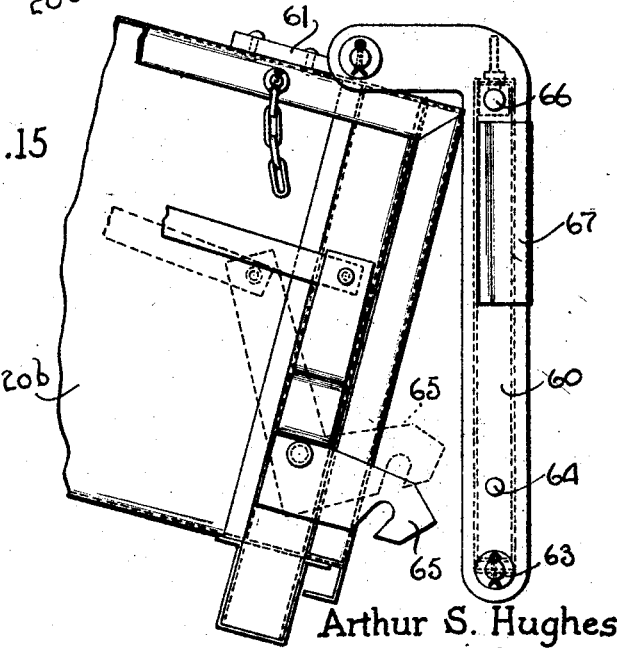

Another form which the invention may take is shown in Figs. 13, 14 and 15. The body 20ᵇ mounts two side bars or hangers 60 (but one is shown) by a hinge connection 61 similar to those already described. A tail gate 62 is pivoted as at 63 to the side bars at their lower ends. The bars 60 have latch pins 64 adapted to be engaged by latches 65 operable by any suitable mechanism, for example, the ones described above. The upper or free end of gate 62 may be locked to the side bars 60 by latches 66 similar to latches 48. Near the upper end on each side the gate has an angle plate 67 riveted or otherwise secured thereto, which bends about the bar 60 (as shown best in Fig. 14) when the gate is closed, whereby the union of the bars and gate is made more secure, and rattling and vibration of the connected parts is minimized.

Fig. 15 shows how the gate will maintain a vertical position when latches 65 have been released from pins 64 and the wagon body 20ᵇ has been tilted for dumping.

In Figs. 16 and 17 the body 20ᵇ mounts side bars 60 and latches 65, as before. The gate 62 has an angle plate 68 secured thereto at each end and each angle plate extends about the outer side of the adjacent side bar 60, as shown. In order to latch the gate to the side bars, a perforation is provided in each side bar near the upper end, and through said perforation and a like perforation provided in angle plate 68 at the proper point, a pin 69 is passed. Preferably there are two pins 69 employed, and a chain 70 may be used to hold each pin to the gate, preventing loss.

Still another form of means for locking the tail gate to the side bars is shown in Figs. 18 and 19. Each bar 60 mounts a pin 71 which projects outwardly from the bar. A channel plate 72 is hinged as at 73 on bar 60 and is perforated so that when swung flat against bar 60 the pin 71 enters said perforation. When a cotter pin 74 is passed through a hole in the pin, the channel plate is held in the position of Fig. 18 wherein the flanges of the channel plate, or at least the rear flange, engages the tail gate to prevent outward swinging thereof. The channel plate is shown in gate-releasing position in dotted lines, Fig. 19.

While I have shown and described various forms which my invention may take, all are merely illustrative, not restrictive; and many changes involving omission, alteration, substitution or reversal of parts may be resorted to without departing from my invention, which is best defined in the following claims.

What is claimed is:—

1. In combination with a vehicle body, a tail gate, fixed pivot pins extending laterally from the lower end of said gate, bars arranged vertically at the opposite ends of the gate and extending above and below the same and receiving said pivot pins at their lower ends so that the bars and the gate are connected, means for pivotally connecting the upper ends of the bars directly to the top of the body in advance of the rear end of the latter, permitting the bars with the gate to swing in connected relation over the top of the body, means for detachably connecting the upper end of said gate to said bars below the said pivoting means, whereby when the detachable connection is released, the tail gate is permitted to swing outwardly on said pivot pins away from the upper ends of the bars, the latter maintaining their connected relation with the gate at the bottom, and a latching mechanism carried by the body and engaging said pivot pins outside said bars, said latching mechanism being capable of disconnection from the said pivot pins to permit the gate and said bars to swing as a unit from the pivotal connecting means at the top of said bars when the detachable connecting means between the upper end of the gate and said bars is in engagement, said latching mechanism, when in locked position, holding the bars and gate against the body in the closed and fully opened positions of the gate.

2. In combination with a vehicle body, a tail gate, fixed pivot pins extending laterally from the lower end of the gate, bars arranged vertically at the opposite ends of the gate and extending above and below the same and receiving said pivot pins at their lower ends so that the bars and the gate are connected, means for pivotally connecting the upper ends of said bars directly to the body in advance of the rear end independently of said gate so that the gate and the bars may be swung over the top of the body, means for detachably connecting the upper end of said gate to said bars below the said pivotal connecting means, whereby when said detachable connecting means is disengaged, the gate may swing outwardly on the pivot pins away from said bars, the latter maintaining their connected relation with the gate at the bottom and their vertical position at the ends of the body, and a latching mechanism carried by the body, said latching mechanism when released permitting the gate and bars to swing as a unit from the pivotal means at the top of said bars, and when the detachable connecting means between the gate and the upper ends of said bars is out of engagement the gate swinging downwardly on said pivots to open position, said latching mechanism cooperating to hold the gate both in open and in closed positions.

3. In combination with a vehicle body, a tail gate, fixed pivot pins extending laterally from the lower end of said gate, bars arranged vertically at the opposite ends of the gate and extending above the gate and receiving said pivot pins at their lower ends so that the bars and the gate are connected to move together, means for pivotally connecting the upper ends of the bars directly to the top of the body in advance of the rear end of the latter, permitting the bars with the gate to swing in connected relation over the top of the body and be supported, means for detachably connecting the upper portion of said gate to said bars below the said pivoting means, whereby when said detachable connection is released the gate is permitted to swing outwardly on said pivot pins away from the upper ends of said bars, the latter maintaining their connected relation with the gate at the bottom, and a latching mechanism between the body, the gate and said bars to hold the gate against said body, said latching mechanism when disconnected from the gate and bars permitting the bars and gate to swing as a unit from the pivotal connecting means at the top of said bars, said latching mechanism when in locked position cooperating to hold the gate against the body in its closed and fully opened positions.

4. In combination with a vehicle body, a pair of pivotally mounted side bars at one end of the body, said bars being mounted to swing in vertical planes, slots in said bars near their upper and hinged ends, a gate pivoted to said bars near their lower ends, and means on the gate adapted to enter said slots to facilitate locking of the gate to the bars.

5. In combination with a vehicle body, a pair of pivotally mounted side bars at one end of the body, said bars being mounted to swing in vertical planes, slots in said bars near their upper and hinged ends, a gate pivoted to said bars near their lower ends, and projections on the gate adapted to enter said slots, said gate projections having perforations whereby a pin may be passed into each projection and lock the gate to the side bars when the gate has been swung into such position that its projections enter said slots.

6. In combination with a vehicle body, a pair of pivotally mounted side bars at one end of the body to swing from their upper ends in substantially vertical planes, each side bar having a longitudinal flange at the rear edge and also having a slot traversing the flange and part of the width of the bar, a gate pivoted to the sidebars near their lower ends, means projecting from each end of the gate and adapted to enter said slots when the gate is swung into the plane of the side bars, and means adapted to enter the projecting means and to engage with the longitudinal flange of the side bars to lock the gate to the side bars.

7. A bar for supporting one end of a wagon tail gate, said bar being angular in cross section whereby a longitudinal flange is provided, and tapering from end to end, said bar having a slot near its larger end traversing the flange and extending part way across the width of the bar, and also having a perforation at the same end for receiving a pivotal element by which it is secured to the wagon body.

In testimony that I claim the foregoing as my own, I have hereto affixed my signature.

ARTHUR SHERIDAN HUGHES.